United States Patent
Wolké

[19]

[11] Patent Number: 6,037,938
[45] Date of Patent: Mar. 14, 2000

[54] METHOD AND A DEVICE FOR DISPLAYING INFORMATION ABOUT A LARGE NUMBER OF INDEPENDENT DATA ELEMENTS

[75] Inventor: Hågan Wolké, Lund, Sweden

[73] Assignee: Qliktech International AB, Sweden

[21] Appl. No.: 08/980,634

[22] Filed: Dec. 1, 1997

[51] Int. Cl.[7] ........................................... G06F 3/14
[52] U.S. Cl. .................... 345/341; 345/346; 345/352; 345/353; 707/1; 707/101
[58] Field of Search ..................... 345/341, 352, 345/353, 968, 973; 395/607, 602, 126, 129; 707/1, 2, 7, 101, 104, 102

[56] References Cited

U.S. PATENT DOCUMENTS

| | | | |
|---|---|---|---|
| 5,204,947 | 4/1993 | Bernstein et al. | 345/353 |
| 5,261,039 | 11/1993 | Miyazaki . | |
| 5,261,093 | 11/1993 | Asmuth | 395/600 |
| 5,293,616 | 3/1994 | Flint . | |
| 5,317,687 | 5/1994 | Torres | 345/353 |
| 5,572,195 | 11/1996 | Heller et al. | 340/825.35 |
| 5,581,685 | 12/1996 | Sakurai | 345/353 |
| 5,649,196 | 7/1997 | Woodhill et al. | 395/620 |
| 5,689,668 | 11/1997 | Beaudet et al. | 345/353 |
| 5,706,449 | 1/1998 | Liu et al. | 345/353 |

FOREIGN PATENT DOCUMENTS

| | | |
|---|---|---|
| 0 380 240 A2 | 8/1990 | European Pat. Off. . |
| 0 420 424 A2 | 4/1991 | European Pat. Off. . |
| 62-121532 | 6/1987 | Japan ........................ G06F 7/24 |
| WO 96/09589 | 3/1996 | WIPO . |

OTHER PUBLICATIONS

Pankova, L.A., et al., "Reducing the query–processing time in relational database management systems", Automation and Remote Control, vol. 46, No. 4, 1985, pp. 530–539.
Patent Abstracts of Japan, vol. II, No. 340, P–634, abstract of JP A 62–121532 (Hitachi) Jun. 2, 1987.
U.S. Serial No. 08/809,403, filed Dec. 1, 1997, entitled "Method and Device for Extracting Information from a Database".
PCT International Search Report.

*Primary Examiner*—Mark K. Zimmerman
*Assistant Examiner*—David E. Brown
*Attorney, Agent, or Firm*—Fish & Richardson P.C.

[57] ABSTRACT

A method of displaying a large number of interdependent data elements in a computer screen area that is small compared with the number of data elements to be displayed is disclosed. Each data element is defined by a data element type and a data element value and has an associated status value. The method comprises the steps of displaying the data element types of the data elements as a scrollable list in the computer screen area, and, for each data element type which defines more than one different data element which has a predetermined status value, displaying a predetermined indication thereof in association with the data element type in the scrollable list; and sorting, in response to a change of the status value of at least one of the data elements, the data element types in the scrollable list according to the status values of the data elements defined by the data element types. An article of manufacture including a computer-readable medium having stored thereon a computer program for carrying out the method is also disclosed.

18 Claims, 4 Drawing Sheets

TABLE 1

| Clothes | Color | Size | ArtNo |
|---|---|---|---|
| shirt | blue | 39 | 1001 |
| shirt | blue | 40 | 1001 |
| shirt | red | 39 | 1003 |
| jeans | blue | 32 | 2100 |
| jeans | blue | 35 | 2100 |

FIGURE 1

METHOD AND A DEVICE FOR DISPLAYING INFORMATION ABOUT A LARGE NUMBER OF INDEPENDENT DATA ELEMENTS

TECHNICAL FIELD

The present invention relates to a method for displaying information about a large number of interdependent data elements in a computer screen area that is small compared with the number of data elements to be displayed, each data element being defined by a data element type and a data element value and having an associated status value.

The invention also relates to an article of manufacture comprising a computer-readable medium having stored thereon a computer program for carrying out the method.

BACKGROUND OF THE INVENTION

WO 96/09589, assigned to the assignee of the present application, discloses a method and a device for extracting information from a database, according to which the data records of the database are examined, when a user has made a selection of a data element, in order to find all data element values which are implied by or consistent with the selection.

Table 1 in FIG. 1 shows an example of a database containing information about different clothes. It contains data elements of the types "Clothes", "Color", "Size" and "ArtNo". The data elements defined by the type "Clothes" may assume the value "shirt" and the value "jeans". Similarly, the data elements of the type "color" may assume the values "blue" and "red", the data elements of the type "size" the value "32", "35", "39" and "40", and the data elements of the type "ArtNo" the values "1001", "1003" or "2100". Before any selection at all has been made, all data elements are selectable. This is indicated in a number of status vectors (not shown), where all data elements ate marked as selectable by means of a predetermined status value.

Now assume that the user wants to know what clothes of size 39 are available. He then selects the data element value "39" of the type "size", e.g. by clicking on "39" in a list of all data element values of the type "size" displayed on a computer screen (not shown). In accordance with the method of WO 96/09589, the data element values "shirt", "blue", "1001", "red", "1103" will be found since they are implied by the selection. Thus, the user now knows that the available clothes of size 39 are a red shirt and a blue shirt having article numbers 1001 and 1003. The user also knows that there is no available pair of jeans of size 39, because the data element value "jeans" is excluded by the selection of the data element "39". When the database has been examined, the status values of those data elements that are excluded by the selection will be changed in the status vector to reflect the selection.

This example is of course a very simplified one, but the same principle may be used for more complex databases which include a large number of data elements.

In accordance with the method of WO 96/09589, the result of a selection may be presented by displaying, on the computer screen, the data element types and values which were found during the examination of the data records or by indicating, on the computer screen, the implied data element types and values by a color different from that used for the data element types and values not implied by the selection.

This presents no problem when the database contains a small number of data elements. When the database contains a large number of data elements of many different types, it may, however, be impossible to display all the data elements at the same time on the computer screen in a comprehensible way.

The above-mentioned problem occurs not only with the method of WO 96/09589, but in many cases where a large number of data elements are to be displayed on a computer screen area that is small compared with the number of data elements to be displayed and where each data element is defined by a data element type and a data element value and has an associated status value.

SUMMARY OF THE INVENTION

Accordingly, the object of the present invention is to propose a solution to the above-mentioned problem.

A more specific object of the present invention is to provide a method for displaying a large number of interdependent data elements in a computer screen area that is small compared with the number of data elements to be displayed, which method makes the data elements available to the user in a clear and comprehensible way.

Another object of the invention is to provide an article of manufacture comprising a computer-readable media having stored thereon a computer program for carrying out the method.

The objects are achieved by a method and an article of manufacture having the features recited in the appended claims.

Thus, the present invention relates to a method for displaying information about a large number of interdependent data elements in a computer screen area that is small compared with the number of data elements to be displayed, each data element being defined by a data element type and a data element value and having an associated status value.

The expression "interdependent data elements" should here be interpreted as including data elements that are related to each other, e.g. by an algorithmic or tabular relation. One common example of interdependent data elements are data elements that are organized in data records which comprise two or more data elements. A change of the status value of one data element in a data record affects the status values of the other data elements in the same data record. It should be understood that all data elements need not be related to all other data elements and that some data elements need not be related to any other data elements at all.

According to the present invention, the data element types are displayed as a scrollable list in the computer screen area. This means that only a limited number of the data element types are visible at the time, but that all data element types can be made to appear in the display area, e.g. in response to the clicking on a scrollbar by the user.

Furthermore, for each data element type which defines more than one different data element which has a predetermined status value, a predetermined indication thereof is displayed in association with the data element type in said scrollable list. The predetermined status value may indicate that a data element is consistent with the selection(s) made hitherto. The predetermined indication then tells the user that there are more than one possible data element value of the data element type in question. In a similar mariner, other predetermined indications may be displayed in order to indicate that a data element type defines more than one different data element which has other predetermined status values, e.g. a status value which indicates the selection of the data element.

The idea of displaying only the different data element types and a predetermined indication for those data element types which can assume more than one different data element value of a predetermined status makes it possible to display information about a large number of data elements in a small area.

The predetermined indication may consist of a particular character, which is displayed adjacent to the data element type, e.g. on the same row as the data element type when a vertically scrollable list is used. It may also consists of a specific background color of the data element type, or be designed in any other suitable way.

In response to a change of the status value of at least one of the data elements, the data element types in the list are sorted according to the status values of the data elements defined by the data element types. Preferably, the data element types of the data elements having said predetermined status value are sorted so that they appear at the beginning of the list.

The change of a status value usually occurs as a result of a selection of a data element in the list in the computer screen area. It may also occur as a result of a selection of a data element value displayed elsewhere on the screen, but being related to data elements in the list in the computer screen area.

The computer program may scan the status values in order to find changed values or obtain a signal from another computer program or module indicating that a change has occurred. By the sorting of the list, the most interesting data element types can be made to appear at the beginning of the list so that the user rapidly can take in the result of a selection.

Data element types defining data elements having the same status value may be sorted in a predetermined order, e.g. alphabetic order.

In response to the activation by a user of a data element type for which said predetermined indication is displayed, at least the data element values of the data elements having the predetermined status values and being defined by the activated data element type is preferably displayed. In other words, the user can look at all data element values which can be assumed by a data element type and which have a predetermined status value. This enables a user to see the values of data element types of interest and to make selections without being distracted by many other uninteresting data element values.

In a preferred embodiment, all data element values of the data elements being defined by the activated data element type are displayed in response to the activation of the data element type. In this way, the user may make further selection among all data element values, also those excluded by earlier selections.

Those displayed data element values and/or data element types that define data elements having the predetermined status value are preferably indicated so that they are easily distinguished by the user. This can be done in a number of ways, but one which is particularly simple and clear is to use a first background color for the data elements having the predetermined status value and a second background color for the data elements having different status values.

For each data element type which defines exactly one data element having the predetermined status value, the data element value of said exactly one data element is preferably displayed in association with the data element type in the list.

A data element which lacks a data element value can be handled in about the same manner as "ordinary" data elements according to the method of the present invention. When a user activates a data element type defining among others a data element which lacks a data element value, no data element value is, however, displayed for this data element because there exists no data element value.

In a preferred embodiment, the method according to the invention further comprises the step of displaying, in the computer screen area, the data element values either directly or in response to the activation by a user of a data element type, and the step of allowing the user to select at least one displayed data element value defining a data element having the predetermined status value. Thus, the display is interactive and the user can make his selection directly in the computer screen area, e.g. by marking one or more data element values which he wants to select. Preferably all displayed data element values are susceptible of selection.

The method according to the invention is particularly advantageous for displaying the result of searches in computerized catalogues including a large number of different articles having many different attributes which may assume a plurality of different values.

The invention may also be realized as an article of manufacture, comprising a computer-readable medium having stored thereon a computer program for carrying out the method.

Other advantages and features of the invention will become apparent from the following description and from the claims.

BRIEF DESCRIPTION OF THE DRAWINGS

FIG. 1, which has already been discussed, is a table and shows an example of a database containing information about different clothes;

DESCRIPTION OF THE PREFERRED EMBODIMENT

The method of the present invention can be carried out by means of any general purpose computer having a processor unit for performing the steps of the method under the control of a computer program and a computer screen for displaying the data elements. The data elements and their status values are suitably stored in a memory of the computer. The computer program for controlling the processor unit may be stored on any computer-readable medium. The method for finding the data elements which are consistent with the selection of a data element value by a user is preferably the above-mentioned method of WO 96/09589, which is hereby incorporated by reference. However, other methods may also be used.

Figure 2:
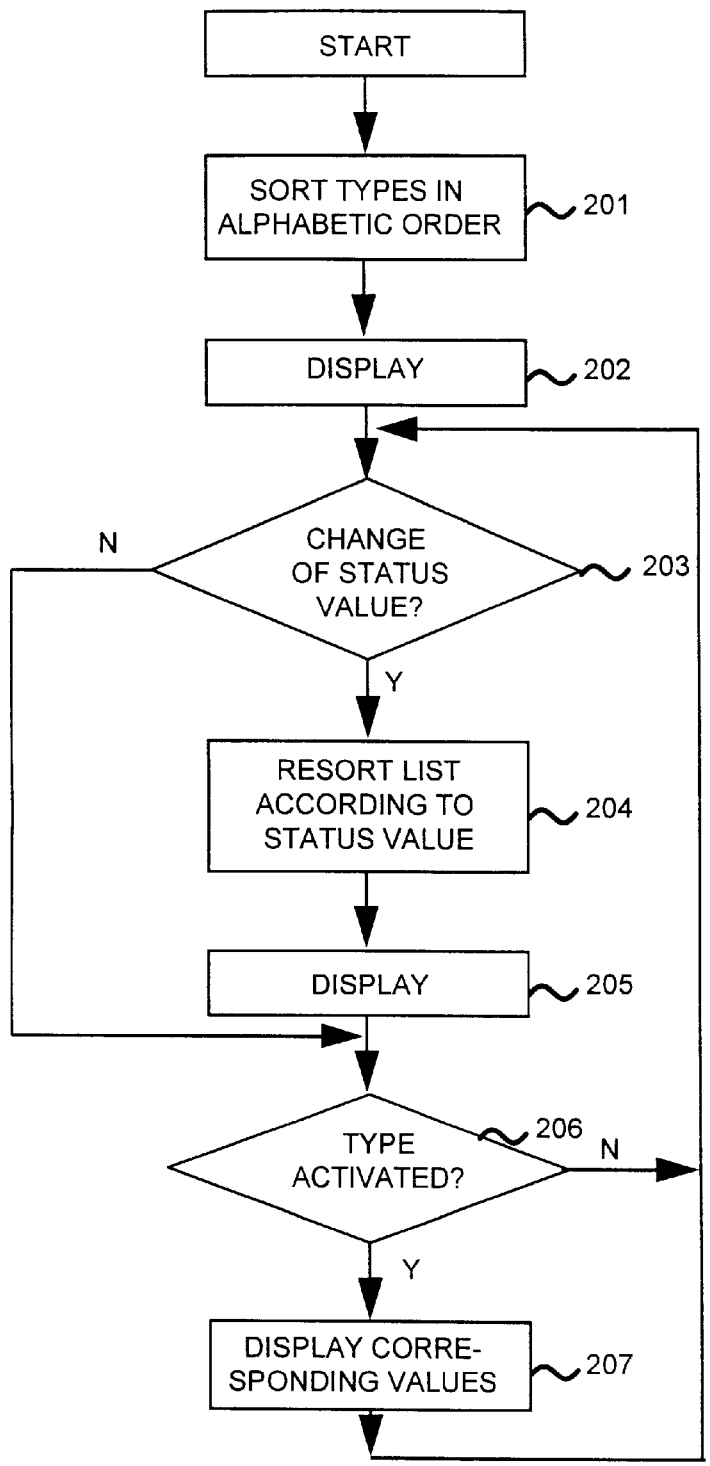
FIG. 2 is a flowchart and shows an example of how the method of the invention can be realized.

FIG. 2 shows a flow chart of an exemplary computer program for realizing the method according to the invention.

When the program is started and no selection has been made, the data element types of all data elements to be displayed are sorted in alphabetic order, step 201 and displayed in this order on the computer screen, step 202. The skilled person knows how to program a computer to display scrollable lists.

In the next step, the program checks if an indication of a status value change has been received, step 203. If the indication has not been received, the program continues to step 206. If the indication has been received the data element types are resorted so that data element types defining data elements consistent with the selection resulting in the status value change appear in alphabetic order at the top of the list, step 204. All data element types are then displayed, step 205, the types not consistent with the selection also being sorted in alphabetic order.

In step 206, the program checks if any data element type has been activated. If this is not the case, the program returns to step 203. Otherwise the program displays all data element values of all the data elements defined by the activated data element type, step 207, and then returns to step 203.

FIGS. 3–6 show what it may look like on the computer screen when the computer program performs the steps of the flowchart of FIG. 2. This example concerns a computerized product catalogue, which contains a large number of products. The products are defined by a plurality of parameters, e.g. material, dimensions, number of outputs, price, etc. Different products may be characterized by different parameters. Different products may be characterized by the same parameters, but the parameters may assume different values. The products, the parameters, and the values of the parameters are stored in tables in a memory of a computer with the products and the parameters as data element types and the values of the products and parameters as data element values. Parameters which are irrelevant for a product lack a data element value. All data elements have an associated status value, which is 1 if the data element is consistent with the selection made so far and otherwise 0.

Figure 3:
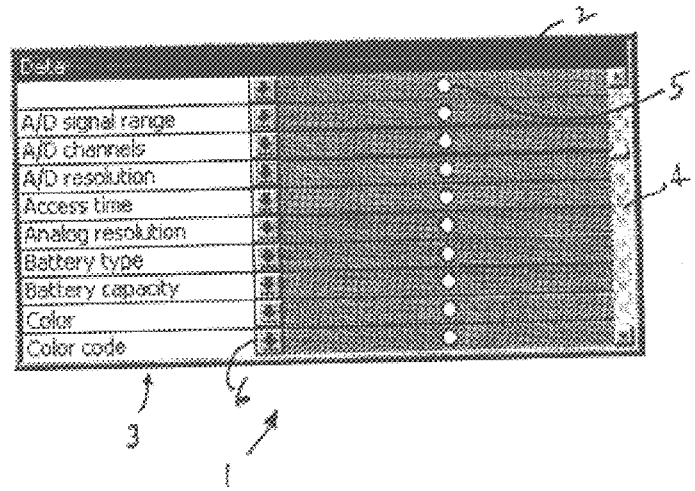
FIGS. 3–6 show examples of how a large number of data element can be displayed on a computer according to the method of the invention.

FIG. 3 shows how the data element types and information about data elements are displayed before any selection has been made and the status value of all data elements is 1. The data element types and the information about the data elements are displayed in a box 1 on a computer screen (not shown). The box comprises a heading 2 and a vertically scrollable list 3 with a scrollbar 4 at the right-hand side of the box. In the left column of the list all the data element types are listed in alphabetic order. In this example only ten parameters appear at the time in the box, but all data element types can be brought forward by means of the scrollbar 4. Adjacent each data element type and on the same row, a white circle 5 is displayed in a grey field. This white circle indicates that the data element type defines more than one data element of status value 1. Thus, there is more than one possible value of this data element type or there is one possible value but also one or more data elements which lack a data element value of this type.

Figure 4:
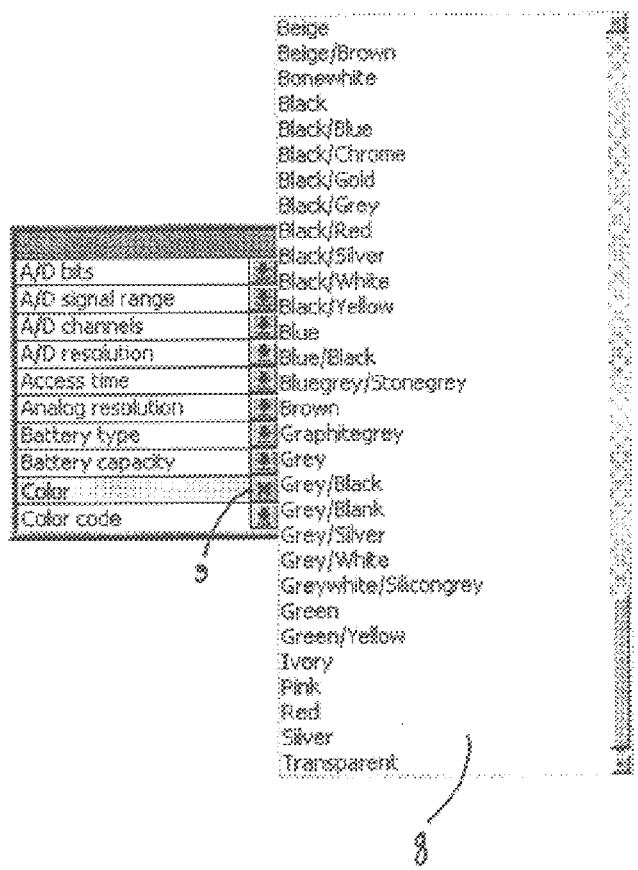

If the user wants to see which values a data element type may assume, he clicks on the arrow 6 adjacent to the data element type. FIG. 4 shows the resulting display when the user has clicked on the arrow at the right of the data element type "color". In a vertically scrollable list 8 to the right of the data element types all different colors of the product in the catalogue are displayed in alphabetic order. The data element type which has been activated is indicated with an "x" 9 where the arrow was displayed before.

Figure 5:
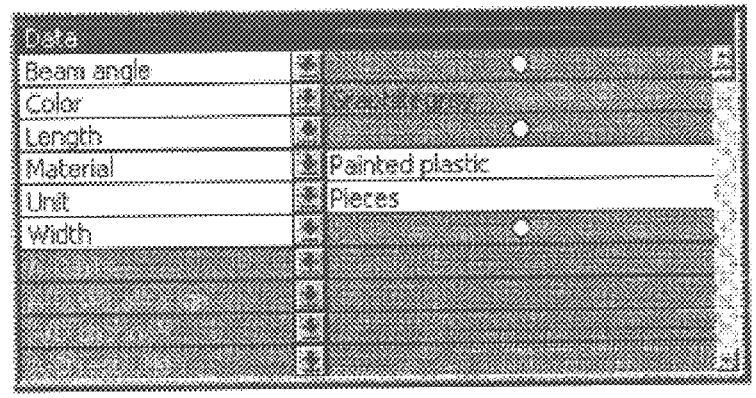

The user may now select one of the displayed colors. Assume that the user is interested in a product that has the color "graphite grey". He then clicks on "graphite grey" in the list. All data element values implied by or consistent with this data element value are found and the status values of the data element values excluded by the selection of "graphite grey" are changed to "0". In response to the change of status values, the scrollable list of data element types to the left in the box is resorted so that the data element types of the data element values implied by the selection of "graphite grey"

appear at the top of the list. They are sorted in alphabetic order and shown on a white background. If, for a certain data element type, there is only one possible data element value, i.e. only one data element value which is consistent with the selection, and no possible data element which lacks a data element value, the one possible data element value is displayed to the right of the data element type at the same row in the list. A white background is used to indicate that it is consistent with the selection. For the data element types which have more than one possible data element value or one possible data element value and one or more possible data element which lack a data element value, the white circle indicator 5 is shown as before. In FIG. 5 the first six data element types are consistent with the selection of "graphite grey". The data element types no. 1, 3 and 6 have more than one possible value. The data element type no. 2 is the one that has the selected value, which is indicated with a different background color. The data element types no. 4 and 5 have only one possible value, which is explicitly indicated. The data element types excluded by the selection, i.e. the data element types for which there is no possible value, are shown in alphabetic order and on a grey bottom following the first six data elements.

Figure 6:
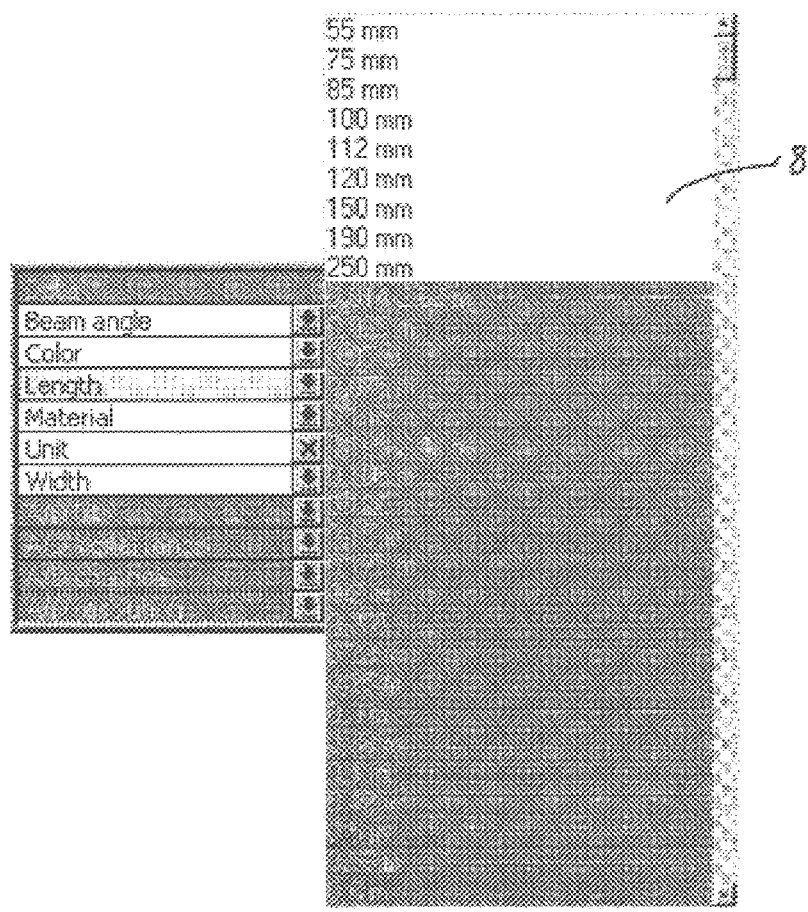

If the user now wants to see the data element values of any one of the data element types for which the white circle is displayed, he clicks on the arrow 6 adjacent the data element type of interest. FIG. 6 shows the resulting display when the user-clicks on "length". All values of the parameter "length" is then displayed in a vertically scrollable list 8 to the right of the data element types. The values of the data elements having the status value 1 are displayed at the top of the list in increasing order. They are displayed on a white background because they are consistent with previous selections. The remaining data elements are displayed thereafter on a grey background to indicate that they are excluded by previous selections.

The skilled person may conceive other embodiments within the scope of the following claims.

What I claim and desire to secure by Letters Patent is:

1. A method of displaying information about a large number of interdependent data elements in a computer screen area that is small compared with the number of data elements to be displayed, each data element being defined by a data element type and a data element value and having an associated status value, comprising:

displaying the data element types of said data elements as a scrollable list in said computer screen area, and, for each data element type which defines more than one different data element which has a predetermined status value, displaying a predetermined indication thereof in association with the data element type in the scrollable list;

sorting, in response to a change of the status value of at least one of said data elements, the data element types in said scrollable list according to the status values of the data elements defined by the data element types, the method further comprising the step of displaying, in response to the activation by a user of a data element type for which said predetermined indication is displayed, at least the data element values of the data elements being defined by the activated data element type and having the predetermined status value, and indicating which of the displayed data element values define data elements having said predetermined status value.

2. A method of displaying information about a large number of interdependent data elements in a computer screen area that is small compared with the number of data elements to be displayed, eahch data element being defined by a data element type and a data element value and having an associated status value, comprising:

displaying the data element types of said data elements as a scrollable list in said computer screen area, and, for each data element type which defines more than one different data element which has a predetermined status value, displaying a predetermined indication thereof in association with the data element type in the scrollable list;

sorting, in response to a chance of the status value of at least one of said data elements, the data element types in said scrollable list according to the status values of the data elements defined by the data element types, the method further comprising the step of indicating which of the displayed data element types define data elements having said predetermined status value.

3. A method according to claim 2, further comprising the steps of displaying, in response to the activation by a user of a data element type for which said predetermined indication is displayed, at least the data element values of the indication is displayed, at least the data element values of the data elements being defined by the activated data element type and having the predetermined status value.

4. A method according to claim 1, wherein all data element values of all data elements that are defined by the activated data element type are displayed, in response to said activation by the user.

5. A method according to claim 1, wherein said data element values of the data elements being defined by the activated data element type are displayed in a scrollable list in the computer screen area.

6. A method according to claim 1 or 2, wherein the step of sorting comprises sorting the data element types so that the data element types of the data elements having said predetermined status value appear at the beginning of said list.

7. A method according to claim 1 or 2, further comprising the step of displaying, for each data element type which defines one and only one data element having the predetermined status value, the data element value of said one and only one data element in association with the data element type in the list.

8. A method according to claim 1 or 2, wherein the data elements to be displayed also comprise data elements which are defined by a data element type, but which lack a data element value.

9. A method according to claim 1 or 2, further comprising the step of displaying, in the computer screen area, the data element values either directly or in response to the activation by a user of a data element type, and the step of allowing the user to select at least one displayed data element value defining a data element having the predetermined status value.

10. An article of manufacture comprising a computer-readable medium having stored thereon a computer program for displaying a large number of interdependent data elements in a computer screen area that is small compared with the number of data elements to be displayed, each data element being defined by a date element type and a data element value and having an associated status value, comprising:

means for displaying the data element types of said data elements as a scrollable list in said computer screen area, and for displaying, for each data element type which defines more than one different data element which has a predetermined status value, a predetermined indication thereof in association with the data element type in the scrollable list;

means for sorting, in response to a change of the status value of at least one of said data elements, the data element types in said scrollable list according to the status values of the data elements defined by the data element types, the article further comprising means for displaying, in response to the activation by a user of a data element type for which said predetermined indication is displayed, at least the data element values of the data elements being defined by the activated data element type and having the predetermined status value, and means for indicating which of the displayed data element values define data elements having said predetermined status value.

11. An article of manufacture comprising a computer-readable medium having stored thereon a computer program for displaying a large number of interdependent data elements in a computer screen area that is small compared with the number of data elements to be displayed, each data element being defined by a data element type and a data element value and having an associated status value, comprising:

means for displaying the data element types of said data elements as a scrollable list in said computer screen area, and for displaying, for each data element type which defines more than one different data element which has a predetermined status value, a predetermined indication thereof in association with the data element type in the scrollable list;

means for sorting, in response to a change of the status value of at least one of said data elements, the data element types in said scrollable list according to the status values of the data elements defined by the data element types, the article further comprising means for indicating which of the displayed data element types define data elements having said predetermined status value.

12. The article of manufacture according to claim 10, further comprising means for displaying the data element values of the data elements being defined by the activated data element type in a scrollable list in the computer screen area.

13. The article of manufacture according to claim 11, further comprising means for displaying, in response to the activation by a user of a data element type for which said predetermined indication is displayed, at least the data element values of the data elements being defined by the activated data element type and having the predetermined status value.

14. An article of manufacture according to claim 10 or 11, wherein the means for sorting comprises means for sorting the data element types so that the data element types of the data elements having said predetermined status value appear at the beginning of said scrollable list.

15. The article of manufacture according to claim 10 or 11, further comprising means for displaying, in response to the selection by a user of a data element type for which said predetermined indication is displayed, all data element values of all data elements that are defined by the activated data element type.

16. The article of manufacture according to claim 10 or 11, further comprising means for displaying, for each data element type which defines one and only one data element having the predetermined status value, the data element value of said one and only one data element in association with the data element type in the list.

17. The article of manufacture according to claim 10 or 11, wherein the data elements to be displayed also comprise data elements which are defined by a data element type, but which lack a data element value.

18. The article of manufacture according to claim 10 or 11, further comprising means for displaying, in the computer screen area, the data element values either directly or in response to the activation by a user of a data element type, and means for allowing the user to select at least a displayed data element value defining a data element having the predetermined status value.

\* \* \* \* \*